(12) United States Patent  
Peng et al.

(10) Patent No.: US 7,522,229 B2  
(45) Date of Patent: Apr. 21, 2009

(54) FLAT PANEL DISPLAY HAVING SUPPORT OF MULTIPLE USE STATES

(75) Inventors: Chih-Kang Peng, Taoyuan (TW); Hsin Pao Kuan, Taoyuan County (TW); Jung-Hsing Peng, Zhongli (TW)

(73) Assignee: Au Optronics Corporation, Taoyuan (TW)

( * ) Notice: Subject to any disclaimer, the term of this patent is extended or adjusted under 35 U.S.C. 154(b) by 360 days.

(21) Appl. No.: 11/031,662

(22) Filed: Jan. 7, 2005

(65) Prior Publication Data

US 2005/0152103 A1 Jul. 14, 2005

(30) Foreign Application Priority Data

Jan. 9, 2004 (TW) .............................. 93100590 A

(51) Int. Cl.
*G02F 1/1333* (2006.01)
(52) U.S. Cl. .......................... 349/58; 248/917; 248/919
(58) Field of Classification Search .................. 349/58, 349/59; 248/917, 918, 919; 361/681
See application file for complete search history.

(56) References Cited

U.S. PATENT DOCUMENTS

| 5,432,626 A * | 7/1995 | Sasuga et al. ................. 349/58 |
| 6,676,098 B2 * | 1/2004 | Lin ............................. 248/371 |
| 6,710,828 B2 * | 3/2004 | Ma et al. ....................... 349/58 |
| 7,143,478 B2 * | 12/2006 | Quijano ....................... 16/445 |
| 2001/0048584 A1 * | 12/2001 | Rosen ......................... 361/681 |
| 2003/0169573 A1 * | 9/2003 | Irie et al. ..................... 361/752 |

FOREIGN PATENT DOCUMENTS

JP 10-143092 5/1998

* cited by examiner

*Primary Examiner*—David Nelms
*Assistant Examiner*—Nathanael R Briggs
(74) *Attorney, Agent, or Firm*—Snell & Wilmer L.L.P.

(57) ABSTRACT

A flat-panel display including a body, a base detachably connected with the body, and a metal plate detachably connected with the base is provided in the present invention. When the body is at a first use-state, the metal plate is affixed to the base and supports the body. When the body is at a second use-state, the metal plate is separated from the base and connected with the body to make the body capable of being hung on a wall. Besides, the metal plate also can reduce the electromagnetic interference effectively.

10 Claims, 2 Drawing Sheets

The invention claimed is:

FLAT PANEL DISPLAY HAVING SUPPORT OF MULTIPLE USE STATES

CROSS-REFERENCE TO RELATED APPLICATIONS

This Application claims priority to Taiwan Patent Application No. 093100590 entitled "FLAT PANEL DISPLAY," filed on Jan. 9, 2004.

FIELD OF INVENTION

The invention relates to a flat panel display incorporating a body selectively being in multiple use-states.

BACKGROUND OF THE INVENTION

Currently, LCD monitors and LCD TV are more and more popular than ever in the flat panel display marketplace. The structure of this kind of products usually includes a body and a base. The base usually consists of a metal component inside and a plastic component covering the metal component. The metal component plays the roles of weight supporting and structure stabilization.

Occasionally, the flat panel display needs to be mounted on wall to meet a user's demand. For larger-size flat panel displays (over 20 inches), an additional wall mount component is needed to assist mounting of displays on the wall.

To meet the requirements of structure strength and weight distribution, traditionally, the metal plate is square in form and usually has a large area making the electromagnetic interference suppressing difficult. In addition, the metal plate of large area increases electromagnetic interference due to the antenna effect of the metal plate.

SUMMARY OF THE INVENTION

The flat-panel display includes a body, a base and a metal plate. The base is detachably connected with the body and the metal plate is selectively connected with either one of the base and the body. When the body is at the first use-state (on the ground), the metal plate is affixed to the base and supports the body. When the body is at the second use-state (hung on the wall), the metal plate is affixed to the body and separated from the base. The metal plate allows the body be hung on the wall.

Two different configurations of the base the metal plate allow two different use-states of single body, reducing cost and space.

The metal plate has an irregular shape, for example, a wave shape, reducing the electromagnetic interference effectively. Besides, openings and bendings are provided on the metal plate to further reduce the electromagnetic interference.

DETAILED DESCRIPTION

Figure 1A:
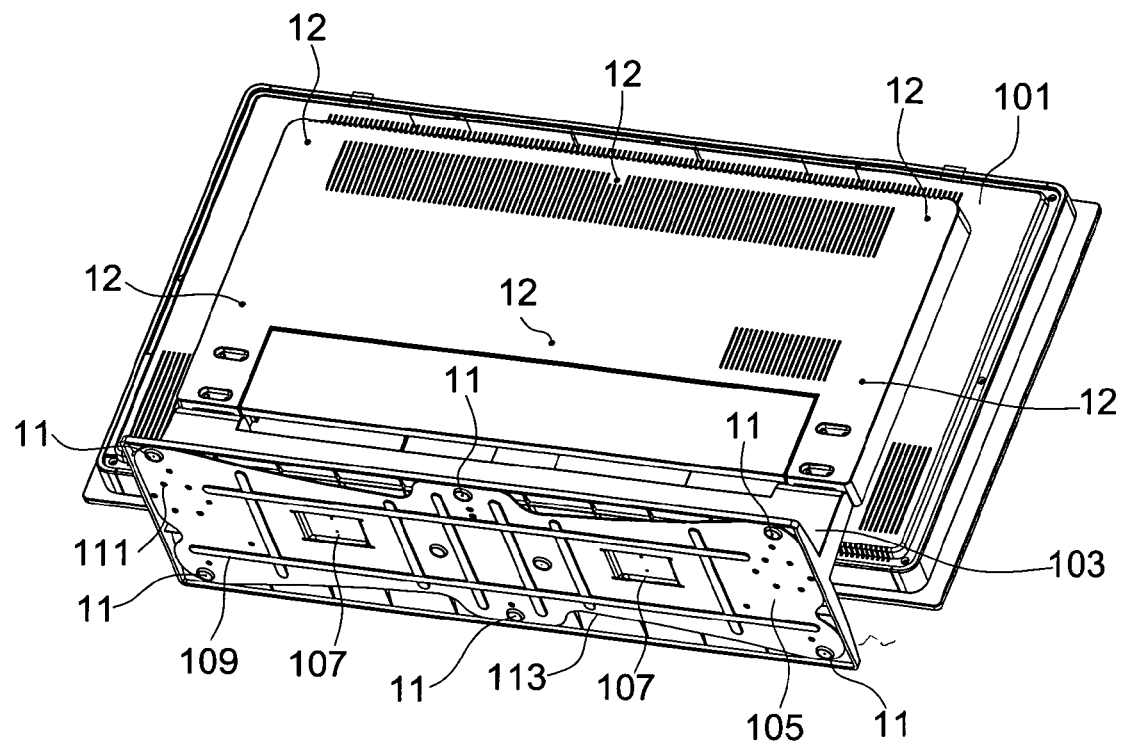
FIG. 1a shows a schematic diagram of an embodiment of the present invention.

FIG. 1a shows a schematic diagram of an embodiment of the present invention. As shown in FIG. 1a, the preferred embodiment, is a flat panel television. The flat panel television includes a body 101, a base 103 and a metal plate 105. The base 103 is detachably connected with the body 101 and the metal plate 103 is selectively connected with either one of the base 103 and the body 101. The metal plate 105 has an edge 113 of irregular shape, and an opening 107; a protrusion 109 and a hole 111 are provided on the metal plate to reduce the electromagnetic interference. The flat panel television is in the first use-state and may stand on the ground or a table. The metal plate 105 and the base 103 are affixed with each other by screws 11 to support the body 101.

Figure 1B:
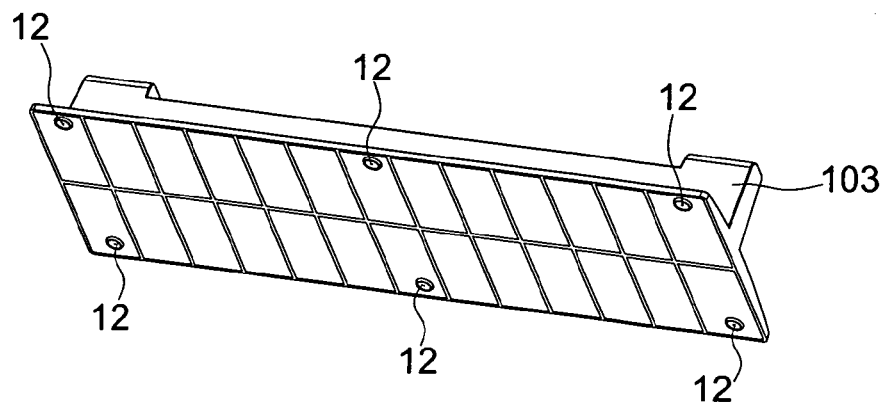
FIG. 1b shows a schematic diagram of the base of the flat panel display of the present invention.

FIG. 1b shows a schematic diagram of the base of the flat panel display. As shown in FIG. 1b, the base 103 has a plurality of female screws 12 for affixing the base 103 and the metal plate 105. In this embodiment, the base 103 is affixed to the metal plate 105 by screws 11 and female screws 12, but in other embodiments, other components or structures, for example, a latch and an aperture structure, can be used for fixing the base 103 and the metal plate 105.

Figure 2:
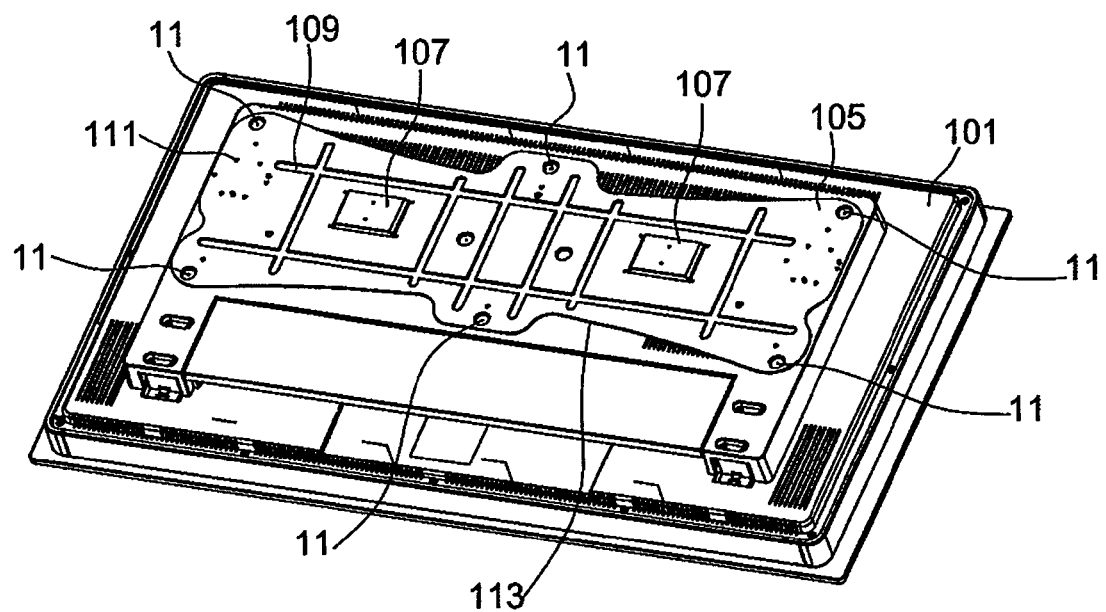
FIG. 2 shows a schematic diagram of the embodiment of the present invention.

FIG. 2 shows a schematic diagram of the embodiment of the present invention. The flat panel television in FIG. 2 is in the second use-state and may be hung on the wall. The metal plate 105 is removed from the base 103 and affixed to the body 101, and the body 101 is separated from the base 103. The metal plate 105 is connected with the backside of the body 101 by a screw 11. However, other components or structures, for example, a latch and an aperture structure, can be used for affixing the base 103 and the metal plate 105 in other embodiments. The flat panel television can be hung on the wall or other vertical surface by a hook, which is on the wall (not illustrated), and an opening 107 on the metal plate 105.

Figure 3:
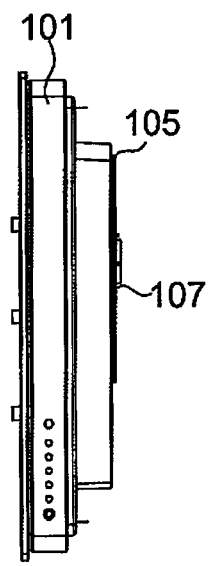
FIG. 3 shows a side view of the embodiment of the present invention.

FIG. 3 shows a side view of FIG. 2. As shown in FIG. 3, the body 101 is affixed with the metal plate 105 directly without any other hanging components or structures, and it reduces production cost and the drawback of the electromagnetic interference.

As shown, the metal plate 105 has edges 113 of irregular shape. An opening 107; a protrusion 109 and a hole 111 are also disposed on the metal plate 105 to reduce the electromagnetic interference. The possible electromagnetic interference generated on the metal plate 105 due to the antenna effect can be reduced effectively.

While the invention has been described in connection with what is presently considered to be the most practical and preferred embodiments, it is to be understood that the invention is not to be limited to the discovered embodiments. The invention is intended to cover various modifications and equivalent arrangements included within the spirit and scope of the appended claims.

The invention claimed is:

1. A flat-panel display comprising:
    a body with an outer backside surface;
    a base detachably connected with the body and having a bottom surface;
    an affixing component capable to be fixed on either one of the bottom surface and the outer backside surface; and
    a metal plate having a hanging structure, and the metal plate capable to be affixed to either one of the bottom surface and the outer backside surface by the affixing component;

wherein when the metal plate is affixed to the outer backside surface, the hanging structure is exposed allowing the body being hung on a substantially vertical plane by the hanging structure;

wherein when the base is connected with the body and the metal plate is affixed to the bottom surface of the base, the body is allowed to stand on a substantially horizontal plane by the base.

2. The flat-panel display according to claim 1, wherein the metal plate has a shape to reduce an electromagnetic interference to the flat panel display.

3. The flat-panel display according to claim 2, wherein the shape is an irregular shape.

4. The flat-panel display according to claim 1, wherein the hanging structure comprises an opening, when the metal plate is affixed to the outer backside surface, the opening is substantially vertically extended.

5. The flat-panel display according to claim 1, when the metal plate is affixed to the outer backside surface, the hanging structure is protruded to cooperate with a hook disposed on the substantially vertical plane.

6. The flat-panel display according to claim 1, wherein the metal plate has an edge of irregular shape.

7. The flat-panel display according to claim 1, wherein the metal plate has a protrusion.

8. The flat-panel display according to claim 1, wherein the base is an inverse T-profile, so that the profile where forming the bottom surface is larger than the profile connecting the body.

9. The flat-panel display according to claim 1, wherein the base includes a screw-hole, and the affixing component is a screw matching the screw-hole.

10. The flat-panel display according to claim 1, wherein the base includes a latch aperture, and the affixing component is a latch dimensioned to connect with the latch aperture.

* * * * *